US008258950B2

(12) United States Patent
Rajapakse et al.

(10) Patent No.: US 8,258,950 B2
(45) Date of Patent: Sep. 4, 2012

(54) METHOD AND APPARATUS FOR CONTROL OR MONITORING OF A CONTAINER

(75) Inventors: Ravindra U. Rajapakse, San Francisco, CA (US); Roderick E. Thorne, Palo Alto, CA (US); Robert Fraser Jennings, San Mateo, CA (US); Steven J. Farrell, Sunnyvale, CA (US); Liping Julia Zhu, San Jose, CA (US)

(73) Assignee: Savi Technology, Inc., Mountain View, CA (US)

( * ) Notice: Subject to any disclaimer, the term of this patent is extended or adjusted under 35 U.S.C. 154(b) by 1258 days.

(21) Appl. No.: 11/183,054

(22) Filed: Jul. 15, 2005

(65) Prior Publication Data

US 2006/0012481 A1 Jan. 19, 2006

Related U.S. Application Data

(60) Provisional application No. 60/588,229, filed on Jul. 15, 2004.

(51) Int. Cl.
  *G08B 13/14* (2006.01)
(52) U.S. Cl. ............... 340/572.1; 340/572.4; 340/568.1
(58) Field of Classification Search ... 701/1; 340/572.1, 340/572.4, 568.1, 505, 539.1, 539.13, 944, 340/5.92, 572.8; 235/385; 62/380, 3.6; 702/185, 702/241; 700/24, 242; 108/51.11, 57.25
See application file for complete search history.

(56) References Cited

U.S. PATENT DOCUMENTS

| | | | |
|---|---|---|---|
| 3,561,634 A | 2/1971 | Meldrum | |
| 3,597,753 A | 8/1971 | Tabankin | |
| 3,665,449 A | 5/1972 | Elder et al. | |
| 3,848,243 A | 11/1974 | Schirmer | |
| 3,878,539 A | 4/1975 | Gooding | |
| 3,961,323 A | 6/1976 | Hartkorn | |
| 4,074,184 A | 2/1978 | Dechene et al. | |

(Continued)

FOREIGN PATENT DOCUMENTS

EP 0 467 036 A2 1/1992

(Continued)

OTHER PUBLICATIONS

Roderick E. Thorne, Philip J. Keleshian, Timothy R. Redler, Joseph S.Chan and Nikola Cargonja, U.S. Appl. No. 60/332,480, filed Nov. 9, 2001 for "Method and Apparatus for Providing Container Security with a Tag".

(Continued)

*Primary Examiner* — Van T. Trieu
(74) *Attorney, Agent, or Firm* — Haynes and Boone, LLP

(57) ABSTRACT

An apparatus includes a carrier, and a system that is responsive to wireless signals transmitted by tags on items carried by the carrier for maintaining a local inventory of items carried by the carrier. A different apparatus involves a carrier having a container with an interior, a sensor for detecting a condition externally of the container that can be related to an environment within the container, and a system that handles information from the sensor in a manner facilitating an evaluation of the likelihood that a problem exists within the container. Another apparatus involves a carrier for a plurality of items, and a system that is responsive to wireless signals received from a remote location for determining a current location of the carrier and for evaluating whether the carrier is proceeding along an intended route.

40 Claims, 2 Drawing Sheets

U.S. PATENT DOCUMENTS

| | | | |
|---|---|---|---|
| 4,258,359 A | 3/1981 | McLamb | |
| 4,287,512 A | 9/1981 | Combs | |
| 4,438,428 A | 3/1984 | Ober et al. | |
| 4,484,181 A | 11/1984 | Schwartz | |
| 4,683,461 A | 7/1987 | Torre | |
| 4,688,244 A | 8/1987 | Hannon et al. | |
| 4,808,974 A | 2/1989 | Cantley | |
| 5,072,212 A | 12/1991 | Sorenson | |
| 5,247,279 A | 9/1993 | Sato | |
| 5,303,844 A * | 4/1994 | Muehlberger | 221/1 |
| 5,341,123 A | 8/1994 | Schuman, Sr. et al. | |
| 5,410,899 A | 5/1995 | McConnell | |
| 5,422,627 A | 6/1995 | Tap et al. | |
| 5,448,220 A | 9/1995 | Levy | |
| 5,479,152 A | 12/1995 | Walker et al. | |
| 5,499,014 A | 3/1996 | Greenwaldt | |
| 5,568,951 A | 10/1996 | Morgan | |
| 5,572,191 A | 11/1996 | Lundberg | |
| 5,615,247 A | 3/1997 | Mills | |
| 5,646,592 A | 7/1997 | Tuttle | |
| 5,656,996 A | 8/1997 | Houser | |
| 5,729,199 A | 3/1998 | Cooper et al. | |
| 5,735,495 A | 4/1998 | Kubota | |
| 5,804,810 A * | 9/1998 | Woolley et al. | 235/492 |
| 5,844,482 A | 12/1998 | Guthrie et al. | |
| 5,887,176 A * | 3/1999 | Griffith et al. | 713/320 |
| 5,907,812 A | 5/1999 | Van De Berg | |
| 5,913,180 A | 6/1999 | Ryan | |
| 5,917,433 A | 6/1999 | Keillor et al. | |
| 5,936,523 A | 8/1999 | West | |
| 5,939,982 A | 8/1999 | Gagnon et al. | |
| 5,959,568 A * | 9/1999 | Woolley | 342/42 |
| 5,999,091 A | 12/1999 | Wortham | |
| 6,204,764 B1 | 3/2001 | Maloney | |
| 6,236,911 B1 | 5/2001 | Kruger | |
| 6,271,753 B1 | 8/2001 | Shukla | |
| 6,274,856 B1 * | 8/2001 | Clothier et al. | 219/627 |
| 6,281,793 B1 | 8/2001 | Haimovich et al. | |
| 6,285,282 B1 | 9/2001 | Dorenbosch et al. | |
| 6,346,886 B1 | 2/2002 | De La Huerga | |
| 6,444,961 B2 * | 9/2002 | Clothier et al. | 219/622 |
| 6,483,473 B1 | 11/2002 | King et al. | |
| 6,497,656 B1 | 12/2002 | Evans et al. | |
| 6,512,455 B2 | 1/2003 | Finn et al. | |
| 6,608,554 B2 | 8/2003 | Weant et al. | |
| 6,661,339 B2 | 12/2003 | Muirhead | |
| 6,736,316 B2 | 5/2004 | Neumark | |
| 6,744,352 B2 | 6/2004 | Lesesky et al. | |
| 6,747,558 B1 | 6/2004 | Thorne et al. | |
| 6,748,292 B2 | 6/2004 | Mountz | |
| 6,753,775 B2 | 6/2004 | Auerbach et al. | |
| 6,796,142 B2 * | 9/2004 | Burn | 62/380 |
| 6,830,181 B1 * | 12/2004 | Bennett | 235/440 |
| 6,844,829 B2 | 1/2005 | Mayor | |
| 6,919,803 B2 | 7/2005 | Breed | |
| 6,943,678 B2 | 9/2005 | Muirhead | |
| 6,975,224 B2 | 12/2005 | Galley, III et al. | |
| 7,023,348 B2 | 4/2006 | Hogan et al. | |
| 7,034,683 B2 | 4/2006 | Ghazarian | |
| 7,042,354 B2 | 5/2006 | Auerbach et al. | |
| 7,082,344 B2 * | 7/2006 | Ghaffari | 700/115 |
| 7,091,864 B2 | 8/2006 | Veitch et al. | |
| 7,098,784 B2 | 8/2006 | Easley et al. | |
| 7,132,926 B2 * | 11/2006 | Vaseloff et al. | 340/5.92 |
| 7,133,743 B2 * | 11/2006 | Tilles et al. | 700/242 |
| 7,242,296 B2 | 7/2007 | Wang et al. | |
| 7,321,308 B1 | 1/2008 | Feibelman | |
| 7,333,019 B2 | 2/2008 | Redler et al. | |
| 7,342,496 B2 | 3/2008 | Muirhead | |
| 7,406,439 B2 * | 7/2008 | Bodin et al. | 705/22 |
| 7,417,543 B2 | 8/2008 | Bergman et al. | |
| 7,579,948 B2 | 8/2009 | Bohman et al. | |
| 7,752,980 B2 | 7/2010 | Muirhead | |
| 7,789,024 B2 | 9/2010 | Muirhead | |
| 7,804,400 B2 | 9/2010 | Muirhead | |
| 2002/0030597 A1 | 3/2002 | Muirhead | |
| 2003/0227392 A1 * | 12/2003 | Ebert et al. | 340/825.49 |
| 2004/0012502 A1 | 1/2004 | Rasmussen | |
| 2004/0069850 A1 | 4/2004 | De Wilde | |
| 2004/0119588 A1 | 6/2004 | Marks | |
| 2004/0174259 A1 | 9/2004 | Peel et al. | |
| 2004/0183673 A1 | 9/2004 | Nageli | |
| 2004/0194471 A1 * | 10/2004 | Rickson | 62/3.6 |
| 2004/0226800 A1 | 11/2004 | Pierga et al. | |
| 2004/0233041 A1 | 11/2004 | Bohman et al. | |
| 2004/0263329 A1 | 12/2004 | Cargonja et al. | |
| 2005/0134457 A1 | 6/2005 | Rajapakse et al. | |
| 2005/0151643 A1 | 7/2005 | Rajapakse et al. | |
| 2005/0240305 A1 * | 10/2005 | Bogash et al. | 700/242 |
| 2005/0241548 A1 | 11/2005 | Muirhead | |
| 2006/0012481 A1 | 1/2006 | Rajapakse et al. | |
| 2006/0282892 A1 | 12/2006 | Jonnala et al. | |
| 2006/0290496 A1 | 12/2006 | Peeters | |
| 2007/0137531 A1 | 6/2007 | Muirhead | |
| 2007/0171080 A1 | 7/2007 | Muirhead | |
| 2007/0185687 A1 * | 8/2007 | Speasl et al. | 702/185 |
| 2008/0088461 A9 * | 4/2008 | Zhu et al. | 340/572.8 |
| 2009/0102649 A1 | 4/2009 | Diener et al. | |
| 2009/0102657 A1 | 4/2009 | Evans et al. | |
| 2009/0102658 A1 | 4/2009 | Evans et al. | |
| 2009/0102659 A1 | 4/2009 | Evans et al. | |
| 2009/0102660 A1 | 4/2009 | Evans et al. | |
| 2011/0068924 A1 | 3/2011 | Muirhead | |

FOREIGN PATENT DOCUMENTS

| | | |
|---|---|---|
| EP | 0 825 554 A1 | 2/1998 |
| EP | 0 984 400 A2 | 3/2000 |
| WO | WO 98/32092 | 7/1998 |
| WO | WO 01/08116 | 2/2001 |
| WO | WO 01/27891 | 4/2001 |

OTHER PUBLICATIONS

Nikola Cargonja, Philip J. Keleshian, Roderick E. Thorne and Steven J. Farrell, U.S. Appl. No. 60/464,067, filed Apr. 18, 2003 for "Techniques for Detecting Intrusion Into a Cargo Container".

Nikola Cargonja, Philip J. Keleshian, Roderick E. Thorne and Ravindra U. Rajapakse, U.S. Appl. No. 60/496,056, filed Aug. 18, 2003 for "Technique Using Cargo Container Motion as a Factor in Intrusion Detection".

Gustavo Padilla and Roderick E. Thorne, U.S. Appl. No. 60/504,580, filed Sep. 19, 2003 for "Technique Using Cargo Container Door Sensor as a Factor in Intrusion Detection".

Nicholas D. Cove, Mark S. Weidick, and Blair B. LaCorte, U.S. Appl. No. 60/518,553, filed Nov. 7, 2003 for "Method and Apparatus for Increased Container Security".

Ravindra U. Rajapakse, Roderick E. Thorne, Robert Fraser Jennings, Steven J. Farrell and Liping Julia Zhu, U.S. Appl. No. 60/588,229, filed Jul. 15, 2004 for "Method and Apparatus for Effecting Control or Monitoring Within a Container".

Nicholas D. Cova, Mark S. Weidick and Blair B. LaCorte, U.S. Appl. No. 10/984,026, filed Nov. 8, 2004 for "Method and Apparatus for Increased Container Security".

Ravindra U. Rajapakse, Steven J. Farrell, Nicholas D. Cova, Mark S. Weidick, Roderick E. Thorne and Gustavo Padilla, U.S. Appl. No. 60/514,968, filed Oct. 27, 2003 for "Mechanisms for Secure RF Tags on Containers".

Steven J. Farrell, Blair B. LaCorte, and Ravindra U. Rajapakse, U.S. Appl. No. 11/158,300, filed Jun. 21, 2005 for "Method and Apparatus for Monitoring Mobile Containers".

Nikola Cargonja, Timothy R. Redler, Richard D. Lockyer and Kent G. Merritt, U.S. Appl. No. 11/266,018, filed Nov. 3, 2005 for "Method and Apparatus for Monitoring the Voltage of a Battery".

Richard D. Lockyer, U.S. Appl. No. 60/732,240, filed Nov. 1, 2005 for "Apparatus and Method for Capacitive Sensing of Door Position".

Richard D. Lockyer and David H. Beauley, U.S. Appl. No. 11/336,402, filed Jan. 20, 2006 for "Method and Apparatus for Capacitive Sensing of Door Position".

* cited by examiner

METHOD AND APPARATUS FOR CONTROL OR MONITORING OF A CONTAINER

This application claims the priority under 35 U.S.C. §119 of U.S. provisional application No. 60/588,229 filed Jul. 15, 2004, the disclosure of which is hereby incorporated herein by reference.

FIELD OF THE INVENTION

This invention relates in general to monitoring and security for containers and, more particularly, to devices that provide automated monitoring and security for shipping containers.

BACKGROUND

A variety of different products are shipped in cargo containers. Products are packed into the container by a shipper, and then the container doors are closed and secured with some type of lock. The container is then transported to a destination, where a recipient removes the lock and unloads the container.

The shipper often finds it advantageous to have some form of monitoring while the container is being transported. For example, the cargo within the container may be relatively valuable products such as computers or other electronic devices, and thieves may attempt to break into the container and steal these products if the container is left unattended during transport. Alternatively, the cargo may be products such as fresh fruit, for which it is advantageous to continuously monitor environmental conditions such as temperature and humidity, in order to avoid or minimize spoilage. As still another example, the cargo may include items that can be damaged by moisture that leaks into the container during a rainstorm, or that escapes from some other item in the container.

It is not cost-feasible to have a person watch a container at all times in order to provide security and/or monitoring. Accordingly, electronic systems have previously been developed to provide a degree of automated security and/or monitoring. Although these pre-existing systems have been generally adequate for their intended purposes, they have not been satisfactory in all respects.

SUMMARY OF THE INVENTION

One of the broader forms of the invention involves: providing a carrier; supporting on the carrier a plurality of items; receiving wireless signals transmitted by tags on the items carried by the carrier; and maintaining a local inventory of items carried by the carrier.

Another of the broader forms of the invention involves: providing a carrier having a container with an interior, the container being adapted to carry a plurality of items within the interior; detecting with a sensor at a location external to the container a condition that can be related to an environment within the container; and handling information from the sensor in a manner facilitating an evaluation of the likelihood that a problem exists within the container.

Yet another of the broader forms of the invention involves: providing a carrier adapted to carry a plurality of items; storing in a system on the carrier information representing an intended route for the carrier; responding to wireless signals received from a remote location by determining a current location of the carrier; and evaluating whether the carrier is proceeding along the intended route.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
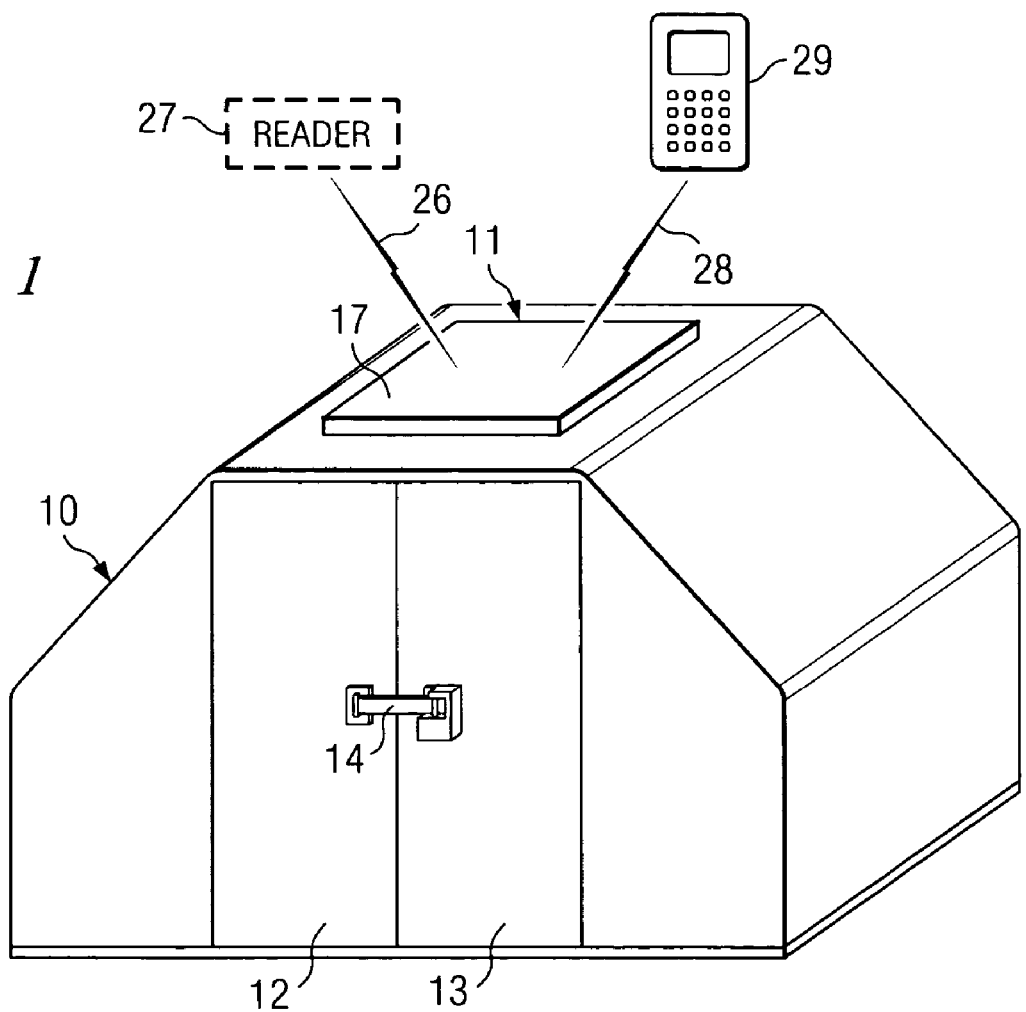
FIG. 1 is a diagrammatic perspective view of an apparatus that embodies aspects of the present invention, and that includes a cargo container and a monitoring and control unit.

FIG. 1 is a diagrammatic perspective view of an apparatus that embodies aspects of the present invention, and that includes a cargo carrier in the form of a container 10 of a known type, and a monitoring and control (MC) unit 11. The major parts of the container 10 are all made of steel, except that the floor of the container 10 is made of wood. However, the container 10 could alternatively be made of any other suitable materials. The container 10 has two pivotally supported doors 12 and 13 that can each move between open and closed positions, and has a latch assembly 14 that can releasably secure the doors 12 and 13 in their closed position. The illustrated configuration of the container 10 and the MC unit 11 is exemplary, and each could alternatively have any of a number of other configurations. In this regard, the MC unit 11 could be configured to be easily retrofit onto an existing container or pallet, or it could be configured as a built-in arrangement that is installed at the factory while a container or pallet is being assembled.

The MC unit 11 has an external portion 17 that is secured to the exterior of the container, and has an internal portion that is not visible in FIG. 1. The external portion 17 and the internal portion are both discussed in more detail later. The MC unit 11 can send and receive radio frequency (RF) wireless signals 26, in order to communicate with a stationary reader 27 when the container is in the vicinity of the reader 27. In addition, the MC unit 11 can send and receive RF wireless signals 28, in order to communicate with a handheld unit 29 when the handheld unit is in the vicinity of the container 10.

Figure 2:
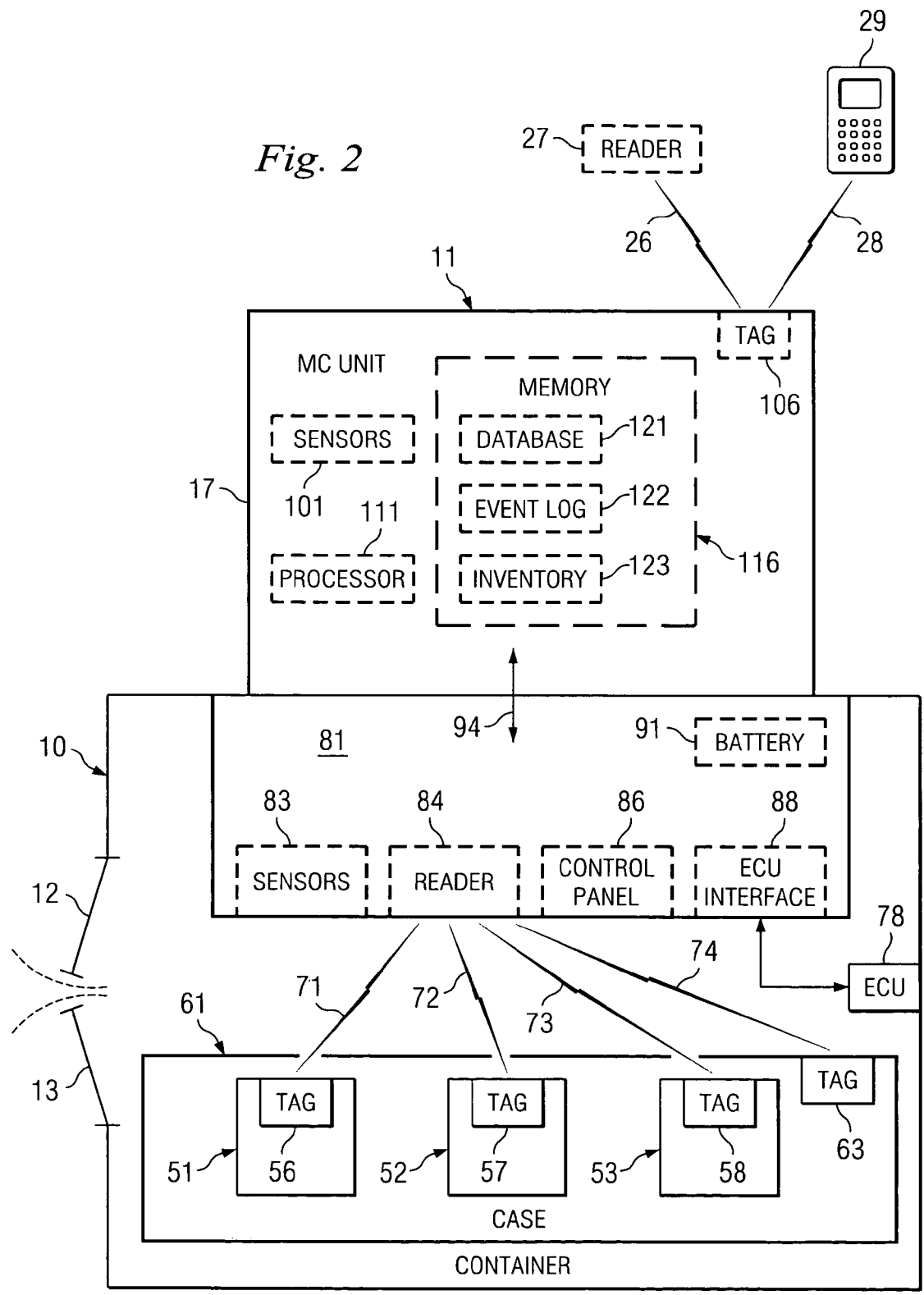
FIG. 2 is a diagrammatic view of the container and the monitoring and control unit, showing certain components within each of the container and the monitoring and control unit.

FIG. 2 is a diagrammatic view of the container 10 and the MC unit 11, showing certain components that are within each of the container 10 and the MC unit 11. In more detail, a plurality of items 51-53 are disposed within the container 10, and the container 10 serves as a carrier for the items 51-53 during shipment. The items 51-53 each have supported thereon a respective radio frequency identification (RFID) tag 56-58 of a known type. The items 51-53 are packed within a case 61, and an RFID tag 63 of a known type is mounted on the case 61. The RFID tags 56-58 and 63 emit respective RF wireless signals 71-74, and the signals 71-74 each contain a respective unique code. The tags 56-58 and 63 emit these wireless signals at periodic intervals, or in response to receipt of a wireless interrogation signal.

In FIG. 2, the cargo includes the items 51-53 and the case 61, but this cargo is exemplary, and could have a variety of other configurations. For example, the case 63 could be omitted, or there could be a plurality of cases that each contain one or more items. Further, the total number of items in the container 10 could be larger or smaller than that shown in FIG. 2, and the number of items in each case 61 could be larger or smaller.

An environmental control unit (ECU) 78 of a known type is installed within the container 10. The ECU 78 can influence the environment within the container 10, for example by heating or cooling the air within the container, by adjusting the pressure of the air within the container, and/or by removing humidity from the air within the container. These environmental control functions are merely exemplary, and the ECU 78 may be configured to control any other selected environmental conditions.

As mentioned above, the internal portion of the MC unit 11 is not visible in FIG. 1, but it is shown diagrammatically at 81 in FIG. 2. The internal portion 81 includes a plurality of sensors, which are collectively shown in a diagrammatic manner at 83. In the disclosed embodiment, the sensors 83 include a temperature sensor, a pressure sensor, a humidity sensor, a moisture sensor, a door sensor for detecting when the container doors 12 and 13 are closed, a radiation sensor for detecting radioactive emissions, and a gas sensor for detecting hazardous or poisonous gases, such as hydrogen cyanide or phosgene. The sensors 83 may optionally include more than one sensor of any given type. In addition, the sensors 83 could optionally include sensors for detecting unauthorized intrusion into the container, such as electro-mechanical sensors that can determine whether the container doors remain in a closed position, and/or RF sensors that can monitor an RF signal for any change indicative of unauthorized intrusion.

The internal portion 81 of the MC unit 11 includes a reader 84, which can receive the wireless signals 71-74 emitted by each of the tags 56-58 and 63 within the container 10. The reader can also selectively emit a wireless interrogation signal to each of the tags 56-58 and 63 within the container 10, in order to cause each of these tags to transmit its wireless signal 71-74. Although the reader 84 is shown diagrammatically as a single block in FIG. 2, it would be possible for the reader 84 to include multiple readers disposed at spaced locations within the container 10, in order to provide better coverage with respect to receipt of the wireless signals emitted by tags within the container.

A manually operable control panel 86 is also part of the internal portion 81 of the MC unit 11, and serves as a user interface for a purpose discussed later. The control panel 86 includes a not-illustrated keypad, and a not-illustrated display, such as a liquid crystal display (LCD). The internal portion 81 of the MC unit 11 further includes an ECU interface, which is operatively coupled to and can control the ECU 78. Thus, the MC unit 11 can cause the ECU 78 to adjust one or more characteristics of the environment within the container 10, for example by heating or cooling the air in the container, or dehumidifying the air in the container.

The internal portion 81 of the MC unit 11 includes a battery 91 that powers the circuitry of the MC unit 11. A double headed arrow 94 in FIG. 2 is a diagrammatic representation of the fact that the internal portion 81 of the MC unit 11 is operatively coupled to the external portion 17 thereof. In the disclosed embodiment, the internal and external portions are electrically coupled by not-illustrated wires that extend through a not-illustrated opening in the metal wall of the container 10. However, it would alternatively be possible for the internal and external portions of the MC unit 11 to be operatively coupled by a wireless link, especially in a configuration where the walls of the container 10 were made of a nonmetallic material that did not tend to obstruct radio waves.

The external portion 17 of the MC unit 11 includes a plurality of sensors that are collectively indicated in a diagrammatic manner at 101. In the disclosed embodiment, the sensors 101 include a temperature sensor, a pressure sensor, a humidity sensor, a moisture sensor, a radiation sensor for detecting radioactive emissions, and a gas sensor for detecting hazardous or poisonous gases, such as hydrogen cyanide or phosgene. The sensors 101 may optionally include more than one sensor of any given type. In addition, the sensors 101 could optionally include sensors for detecting unauthorized intrusion into the container, such as electro-mechanical sensors that can determine whether the container doors remain in a closed position, and/or RF sensors that can monitor an RF signal for any change indicative of unauthorized intrusion.

The external portion 17 further includes RFID tag circuitry 106 of a known type. The circuitry 106 can send and receive the wireless signals 26 and 28 that are respectively associated with the reader 27 and the handheld unit 29. As evident from the foregoing discussion, the disclosed embodiment includes RFID tag circuitry 106 and a reader 84. However, it would alternatively be possible to use an RF transmitter in place of the tag circuitry 106, and an RF receiver in place of the reader 84.

The external portion 17 includes a processor 111 of a known type, and a memory 116. The memory 116 stores information that includes a database 121, an event log 122, and a container inventory 123. The hardware of the processor 111 and the memory 116 may, for example, be implemented using a commercially available micro-controller.

The RFID tag 106 in FIG. 2 is a type of tag referred to in the industry as a long-range tag. The wireless signals that it emits have a relatively long range, such as 100 meters or more. It would be advantageous if each of the tags 56-58 and 63 could also be a long-range tag. However, long-range tags are typically too expensive to be placed on all of the items and cases. Consequently, long-range tags are typically placed on valuable items and/or on larger devices, including carriers such as containers, trucks and pallets that are used to carry a number of smaller items. For smaller items, it is common to use tags of a type commonly known in the art as short-range tags.

Consequently, in FIG. 2, the RFID tags 56-58 and 63 are short-range tags, and may be either passive or active short-range tags. They emit wireless signals with relatively short ranges, and usually need to be within about 1-10 meters of a reader in order for the reader to receive the tag's RF signal. If there is a metal obstruction between the tag and the reader, for example where the tag is disposed within a metal container and the reader is disposed outside the container, it can be difficult or impossible for the reader to directly and reliably receive wireless signals emitted by the tag.

In the disclosed embodiment, the reader 84 is provided within the container 10, in order to reliably receive the signals transmitted by all of the tags within the container, including the short-range tags 56-58 and 63. This permits the MC unit 11 to survey the contents of the container. This survey can be done periodically, and/or in response to an event such as detection of the opening or closing of a door 12 or 13 of the container.

In more detail, the reader 84 receives the RF signals 71-74 that are emitted by tags within the container 10, and passes information from these signals on to the processor 111 of the MC unit. The processor 111 then formulates an inventory of what is present in the container 10, and stores this inventory at 123 in the memory 116. Each time the processor formulates such an inventory, it compares the newly-formulated inventory with a previously-formulated inventory that is already stored in the memory 116.

If the newly-formulated and previously-formulated inventories do not match, it may possibly be due to a theft of something from the interior of the container. Consequently, the MC unit 11 stores in the event log 122 of the memory 116 an event entry, which includes a time and date, and an indication of the event that occurred. The MC unit 11 can then use the tag 106 to broadcast a wireless signal that contains an indication of an alarm. If the tag 106 is currently within range of a reader 27, the reader 27 will receive and handle the alarm, for example by bringing it to the attention of a person so that the person can go to the container and investigate. If the tag 106 does not happen to currently be within the range of a reader 27 when the tag begins broadcasting the alarm signal, the tag 106 can continue periodically broadcasting the alarm signal until the tag eventually does come to be within the range of a reader 27. The MC unit 11 will remain in a state that reflects the occurrence of the alarm condition, until the reader 27 sends a signal instructing the MC unit 11 to clear the condition and return to normal operation. In this manner, the MC unit 11 provides a degree of theft detection.

The database 121 in the memory 116 includes a definition of internal and external parameters for each of a plurality of different items, such as the items 51-53. As discussed above, the MC unit 11 periodically inventories the contents of the container 10. Alternatively, or in addition, the MC unit can inventory the contents of the container 10 whenever it receives from the reader 27 an instruction to inventory the contents. For each item detected within the container 10, the processor 111 can check to see whether the database 121 has a set of specified parameters for that item.

For example, if a detected item within the container happens to be coffee beans, the temperature and humidity within the container 10 must be maintained within acceptable ranges, in order to keep the coffee beans fresh. Similarly, if a detected item happens to be fresh fruit, the specified parameters may include an appropriate temperature and humidity needed to keep the fruit fresh as long as possible. If the internal conditions currently detected within the container using the internal sensors 83 are not consistent with the specified parameters, then the MC unit 11 can control the ECU 78 through the ECU interface 88 in order to bring one or more of the environmental conditions within container 10 into conformity with the specified parameter. For example, if a detected item is fresh fruit, and if the absolute value of the difference between the current temperature and a specified temperature parameter is greater than a specified differential, the MC unit 11 can use the ECU 78 to heat or cool the air inside the container 10 until the actual temperature conforms to the specified temperature parameter.

Where fresh fruit is detected, a different parameter is an indication of how long the fruit can safely remain within a container without spoiling. If the fruit remains in the container 10 for longer than the specified number of days, the MC unit 11 can transmit through the tag 106 a wireless signal raising an alarm condition. Items other than fruit may also have corresponding parameters that specify expiration dates.

With respect to the parameters stored in the database 121 of the memory 116, a user has the ability to make adjustments to the parameters. For example, a user holding the handheld device 29 can use the device to make changes to parameters. A second approach for changing the stored parameters would be for the user to make the adjustments in a not-illustrated central computer at a remote location, and then download the revised parametric information from the computer to the MC unit 11, for example using the reader 27, wireless signals 26, and tag 106. In the disclosed embodiment, both the handheld device 29 and the control panel 86 require the user to enter a valid password, in order to ensure that adjustments to parameters are only made by persons with appropriate authorization. For example, when wireless signals at 26 or 27 include adjusted data, they would also include an encrypted password known to the particular MC unit.

A third approach is that a user who is inside the container 10 can use the manually-operable control panel 86 to make adjustments to the parameters. Since the control panel 86 is inside the container, a prospective thief or other person outside the container cannot tinker with the control panel 86 and try to guess the password while the container doors are closed and secured with a seal. Moreover, even from inside the container, a user would need to enter a valid password, in order to ensure that only authorized persons make adjustments to parameters.

The MC unit 11 also has the capability to maintain within the database 121 a record of environmental measurements, and to monitor the environment within the container 10 for changes. For example, and without regard to the parameters that are stored in the database 121, if the MC unit finds that the temperature or humidity within the container has changed by a specified amount, and/or has done so in less than a specified interval of time, the MC unit 11 can treat this as an alarm condition and use the tag 106 to broadcast a wireless alarm signal at 26 and 28.

The sensors 83 and 101 can be used to detect leakage of the contents of cargo being transported within the container 10. For example, the radiation sensor at 83 can detect excessive radioactive emissions within the container 10, and the radiation sensor at 101 can detect the extent to which such radioactive emissions may be escaping the container. As another example, the gas sensor at 83 can detect leakage from a cargo item of hazardous or poisonous gases, such as hydrogen cyanide or phosgene. The radiation sensor at 101 can be used to detect the extent to which radioactive radiation is escaping the container 10. Detection of such leakage within a container can be helpful in permitting a person to be warned of a problem before he or she opens the container doors, rather than simply opening the doors of the container and being unexpectedly exposed to a hazard such as radioactive radiation or a poisonous gas. Detection of such leakage outside the container is helpful in determining the extent to which the integrity of the container may have become compromised, and thus the extent to which there may be a hazard externally of the container.

As another example, the external moisture sensor at 17 can be helpful in determining whether the container has been subjected to rain, because rain can present the potential for leakage of water into the container, especially where it is already known that the particular container has experienced some physical damage and is no longer fully resistant to the entry of rain. And the internal moisture and humidity sensors at 83 can be helpful in directly detecting water that has leaked into the container from the exterior thereof, or from items being transported within the container. It will be understood that rainwater leakage within a container can be very localized, and so it could be difficult to provide enough sensors throughout the interior of the container to reliably detect all possible moisture leakage anywhere within the container. Consequently, using an external moisture sensor to detect the exposure of the container to rain can in some circumstances provide a more reliable warning of the potential for moisture leakage than the use of several internal moisture sensors.

The MC unit 11 may be a "smart" device that is capable of certain types of intelligent activity. For example, the memory 116 may contain not-illustrated geographic information of a general type, as well as information specific to the route along which the container is currently supposed to be traveling. When the MC unit 11 comes within proximity of a reader 27, the reader 27 can provide the MC unit with information about where that particular reader 27 is located. Since the container 10 is in the general vicinity of that reader, the MC unit 11 knows where it is currently located. The MC unit 11 can compare this to the intended route of the container, in order to verify that the container 10 is in fact being transported along the route that it is supposed to be following. If not, it may mean that the container 10 has been stolen, and so the MC unit can store an event entry in the event log 122, and then use the tag 106 to broadcast a wireless signal that contains an indication of an alarm.

On a more specific level, the memory 116 in the MC unit 11 may also contain shipment information and/or supply chain management information, such as a shipping number, a billing number, and so forth. With this additional information, the MC unit 11 (acting as a smart device) can determine not only whether it is being transported along the proper route, but also whether it is progressing along that route according to the expected timetable. If a discrepancy is detected, the MC unit 11 can store an event entry in the event log 122, and then use the tag 106 to broadcast a wireless signal that contains an indication of an alarm.

Another capability of the MC unit 11 as a "smart device" would involve downloading local business logic to the MC unit 11 through a nearby reader 27. For example, depending on the value of the current contents of the container, and/or the current location of the container, the MC unit 11 could select an appropriate security level from two or more pre-defined security levels, and then implement that selected level for purposes of controlling what is required for someone to obtain access to the interior of the container.

Although the disclosed embodiment involves a carrier that is a shipping container, some or all of the aspects of the invention can also be applied to other types of carriers, such as trucks and pallets. Many other variations, modifications and configurations are also possible, without departing from the spirit and scope of the present invention, as defined by the following claims.

What is claimed is:

1. An system comprising:
   a carrier adapted to carry a plurality of items, each of the plurality of items having at least one radio frequency (RF) tag attached thereto; and
   a control unit supported on said carrier, the control unit including an internal portion coupled to an interior portion of the carrier and an external portion coupled to an external portion of the carrier, the internal portion including at least one sensor and at least one reader responsive to wireless signals transmitted by the RF tags attached to the items carried by said carrier, and the external portion including a processor, a memory, and at least one sensor, the control unit maintaining a local inventory of items carried by said carrier.

2. The system according to claim 1, wherein the control unit is responsive to wireless signals transmitted by the RF tags on items carried by said carrier for detecting a change in the local inventory of items carried by the carrier.

3. The system according to claim 2, wherein the memory of the control unit maintains a log identifying changes detected in said inventory and identifying when each such change was detected.

4. The system according to claim 2, wherein the control unit includes a wireless communication portion that can transmit to a location remote from said carrier and the control unit a wireless communication containing information relating to a change in said inventory.

5. The system according to claim 1,
   including a manually operable portion through which a person can interact with the control unit; and
   wherein the control unit is responsive to information in said local inventory for selectively applying one of two different security levels that respectively restrict use of said manually operable portion in different ways.

6. The system according to claim 5, wherein said manually operable portion includes a handheld unit that can communicate with the control unit through wireless signals.

7. The system according to claim 5, wherein said carrier includes a container with an interior; and
   wherein said manually operable portion includes a manually operable control panel that is located within said interior of said container.

8. The system according to claim 1, further comprising:
   an environmental control portion that is provided on the interior protion of said carrier and that can influence an environmental condition within said interior portion of said carrier,
   wherein the control unit controls said environmental control portion as a function of information in said local inventory and as a function of an output of at least one of the interior portion sensors and the exterior portion sensors.

9. The system according to claim 8, wherein said interior portion sensor is responsive to said environmental condition at a location within said interior of said container.

10. The system according to claim 8, wherein said exterior portion sensor is responsive to said environmental condition at a location external to said container.

11. The system according to claim 8, wherein the memory of the control unit stores data that defines respective acceptable limits of said environmental condition for respective different inventory items, and causes said environmental control portion to control said environmental condition as a function of one of said limits selected as a function of said local inventory.

12. The system according to claim 11, wherein the control unit includes a wireless communication portion that can transmit to a location remote from said carrier and the control unit a wireless communication containing information relating to said environmental condition being past said selected limit.

13. The system according to claim 11, including a manually operable portion through which a person can interact with the control unit and selectively change said data therein.

14. The system according to claim 13,
   wherein said manually operable portion includes one of: a handheld unit that can communicate with the control unit through wireless signals; and
   a manually operable control panel that is located within said interior of said carrier.

15. The system according to claim 11, wherein said environmental condition is one of temperature, pressure, and humidity.

16. The system according to claim 1, wherein the control unit stores data identifying respective maximum periods of time that respective items can remain in said carrier, and is responsive to said local inventory for determining whether any item remains in said carrier for longer than its respective maximum period of time.

17. The system according to claim 16, wherein the memory of the control unit maintains a log identifying each determination by the control unit that an item has been in said carrier for longer than its respective maximum period of time.

18. The system according to claim 16, wherein the control unit includes a wireless communication portion that can transmit to a location remote from said carrier and the control unit a wireless communication containing information reflecting a determination by the control unit that an item has been in said carrier for longer than its respective maximum period of time.

19. A system comprising:
a carrier having a container with an interior, and adapted to carry a plurality of items within said interior, each of the plurality of items having at least one radio frequency (RF) tag attached thereto;
an external sensor disposed externally of said container for detecting a condition that can be related to an environment within said container or external to the container; and
a control unit supported on said carrier, the control unit having an external portion on an external portion of the carrier and an internal portion in the interior of the container having a reader and at least one internal sensor, the control portion responsive to an output of said sensors, the control unit handling information from said sensors in a manner facilitating an evaluation of the likelihood that a problem exists within said container the control unit further be responsive to wireless signals transmitted by the RF tags and maintaining a local inventory of items carried by said carrier.

20. The system according to claim 19, wherein the control unit carries out, as a function of said output of said sensors, said evaluation of the likelihood that a problem exists within said container.

21. The system according to claim 20, wherein said sensors are responsive to one of radiation, a hazardous gas, moisture, temperature, pressure, and humidity.

22. The system according to claim 20, wherein the control unit includes a wireless communication portion that can transmit to a location remote from said carrier and the control unit a wireless communication containing information that is a function of the output of the sensors.

23. A method comprising:
providing a carrier;
supporting on said carrier a plurality of items, each of the plurality of items having at least one radio frequency (RF) tag attached thereto;
receiving, by a reader in a control unit supported on the carrier wireless signals transmitted by the RF tags attached to said items carried by said carrier;
monitoring, by one or more sensors internal to the carrier, an environmental condition of an interior of the carrier;
formulating, by a processor of the control unit, a local inventory of the items carried by the carier based on the received wireless signals transmitted by the RF tags attached to the items carried by the carrier; and
maintaining, in a memory of the control unit, the local inventory on the carrier of items carried by said carrier.

24. The method according to claim 23, further comprising: detecting a change in said inventory in response to the wireless signals transmitted by RFID tags on items carried by said carrier.

25. The method according to claim 24, including maintaining a log identifying changes detected in said inventory and identifying when each such change was detected.

26. The method according to claim 24, including transmitting to a location remote from said carrier a wireless communication containing information relating to a change in said inventory.

27. The method according to claim 23, including:
providing a manually operable portion through which a person can interact with said system; and
responding to information in said local inventory by selectively implementing one of two different security levels that respectively restrict use of said manually operable portion in different ways.

28. The method according to claim 24, including:
providing an environmental control portion that can influence an environmental condition within said interior of said carrier; and
controlling said environmental control portion as a function of information in said local inventory and as a function of an output of said one or more sensors internal to the carrier.

29. The method according to claim 28, including positioning said sensor so that said sensor is responsive to said environmental condition at a location within said interior of said container.

30. The method according to claim 28, further comprising providing one or more sensors external to the container that are responsive to said environmental condition at a location external to said container.

31. The method according to claim 28, including:
storing data that defines respective acceptable limits of said environmental condition for respective different inventory items; and
causing said environmental control portion to control said environmental condition as a function of one of said limits selected as a function of said local inventory.

32. The method according to claim 31, including transmitting to a location remote from said carrier a wireless communication containing information relating to said environmental condition being past said selected limit.

33. The method according to claim 31, including selecting one of temperature, pressure, and humidity as said environmental condition.

34. The method according to claim 23, including:
storing data identifying respective maximum periods of time that respective items can remain in said carrier, and
using said local inventory to determine whether any item remains in said carrier for longer than its respective maximum period of time.

35. The method according to claim 34, including maintaining a log identifying each determination by said system that an item has been in said carrier for longer than its respective maximum period of time.

36. The method according to claim 35, including transmitting to a location remote from said carrier a wireless communication containing information reflecting a determination by said system that an item has been in said carrier for longer than its respective maximum period of time.

37. A method comprising:
providing a carrier having a container with an interior, said container being adapted to carry a plurality of items within said interior;
detecting with a sensor at a location external to said container a condition that can be related to an environment within said container or external to the container;
handling information from said sensor in a manner facilitating an evaluation of the likelihood that a problem exists within said container;
receiving, by a reader in a control unit on the carrier wireless signals transmitted by radio frequency (RF) tags attached to each of said items carried by said carrier; and formulating, by a processor of the control unit, a local inventory of the items carried by the carrier based on the received wireless signals transmitted by the RF tags attached to the items carried by the carrier: and maintaining a local inventory on the carrier of items carried by said carrier.

38. The method according to claim 37, including carrying out, as a function of said output of said sensor, said evaluation of the likelihood that a problem exists within said container.

39. The method according to claim 37, including selecting said sensor to be responsive to one of radiation, moisture, temperature, pressure, humidity, and a hazardous gas.

40. The method according to claim 37, including transmitting to a location remote from said carrier a wireless communication containing information that is a function of the output of said sensor.

* * * * *